US012135628B2

(12) United States Patent
Garg et al.

(10) Patent No.: US 12,135,628 B2
(45) Date of Patent: Nov. 5, 2024

(54) PERFORMANCE BUG DETECTION AND CODE RECOMMENDATION

(71) Applicant: MICROSOFT TECHNOLOGY LICENSING, LLC., Redmond, WA (US)

(72) Inventors: Spandan Garg, Calgary (CA); Paul Sean Harrington, Seattle, WA (US); Chen Wu, Beiing (CN); Roshanak Zilouchian Moghaddam, Kirkland, WA (US)

(73) Assignee: MICROSOFT TECHNOLOGY LICENSING, LLC., Redmond, WA (US)

( * ) Notice: Subject to any disclaimer, the term of this patent is extended or adjusted under 35 U.S.C. 154(b) by 683 days.

(21) Appl. No.: 17/198,662

(22) Filed: Mar. 11, 2021

(65) Prior Publication Data

US 2022/0222165 A1    Jul. 14, 2022

Related U.S. Application Data

(60) Provisional application No. 63/136,376, filed on Jan. 12, 2021.

(51) Int. Cl.
*G06F 11/34*    (2006.01)
*G06F 8/41*     (2018.01)
*G06F 8/71*     (2018.01)
*G06F 11/36*    (2006.01)

(52) U.S. Cl.
CPC .......... *G06F 11/3428* (2013.01); *G06F 8/427* (2013.01); *G06F 8/443* (2013.01); *G06F 8/71* (2013.01); *G06F 11/3604* (2013.01)

(58) Field of Classification Search
None
See application file for complete search history.

(56) References Cited

U.S. PATENT DOCUMENTS

| 8,219,980 B2 | 7/2012 | Bates et al. |
| 11,416,245 B2* | 8/2022 | Irvin ........................... G06F 8/75 |
| 2005/0234887 A1* | 10/2005 | Harako ..................... G06F 8/36 |
| 2005/0262056 A1* | 11/2005 | Hamzy ...................... G06F 8/36 |
| 2016/0054994 A1* | 2/2016 | Sakamoto ............... G06F 16/22 |
|  |  | 717/120 |
| 2017/0212829 A1 | 7/2017 | Bales et al. |

(Continued)

OTHER PUBLICATIONS

"The First Real-time Semantic Code Analysis—Powered by AI", Dec. 5, 2020, 8 Pages.

(Continued)

*Primary Examiner* — Lewis A Bullock, Jr.
*Assistant Examiner* — Mark A Gooray

(57) ABSTRACT

An automated system for detecting performance bugs in a program and for providing code recommendations to improve the performance of the program generates a code recommendation table from performance-related pull requests. The performance-related pull requests are identified in part from a classifier trained on semi-supervised data. A code recommendation table is generated from performance-related pull requests and is searched for similarly-improved code based on a set of difference features that includes structural and performance features of the before-code of a pull request that is not in the after-code.

19 Claims, 11 Drawing Sheets

(56) References Cited

U.S. PATENT DOCUMENTS

| | | | |
|---|---|---|---|
| 2018/0081881 A1 | 3/2018 | Poddar et al. | |
| 2018/0150742 A1 | 5/2018 | Woulfe et al. | |
| 2019/0228319 A1 | 7/2019 | Gupta et al. | |
| 2019/0332376 A1* | 10/2019 | Borra | G06F 11/3442 |
| 2020/0134476 A1* | 4/2020 | Silva | G06F 8/36 |
| 2020/0301721 A1* | 9/2020 | Porter | G06F 9/44578 |
| 2022/0214872 A1* | 7/2022 | Kay | G06F 8/71 |

OTHER PUBLICATIONS

Bielik, et al., "Learning a Static Analyzer from Data", In Proceedings of the 29th International Conference on Computer Aided Verification, Jun. 24, 2017, 34 Pages.

Coppa, et al., "Input-sensitive profiling", In Proceedings of the 33rd ACM SIGPLAN Conference on Programming Language Design and Implementation, Jun. 2012, pp. 89-98.

Gayhardt, et al., "What is Application Insights?", Jun. 3, 2019, 11 Pages.

Gupta, et al., "Intelligent Code Reviews Using Deep Learning", In Proceedings of the 24th ACM SIGKDD International Conference on Knowledge Discovery and Data Mining (KDD'18) Deep Learning Day, Aug. 2018, 9 Pages.

Han, et al., "Performance Debugging in the Large via Mining Millions of Stack Traces", In Proceedings of the 34th International Conference on Software Engineering, Jun. 2, 2012, pp. 145-155.

Kallender, Paul, "Trend Micro Will Pay for PC Repair Costs", Apr. 28, 2005, 3 Pages.

Lewkowicz, Jakub, "Augmented Intelligence Will Help, Not Replace, Human Workers", Mar. 5, 2020, 4 Pages.

Li, et al., "ETW Tracing", Mar. 30, 2017, 5 Pages.

Luan, et al., "Aroma: code recommendation via structural code search", In Proceedings of the ACM on Programming Languages, Oct. 2019, 28 Pages.

Manning, et al., "Foundations of statistical natural language processing", In Publications of MIT Press, May 1999.

Mituzas, Domas, "embarrassment", Jun. 26, 2009, 6 Pages.

Morris, Glen Emerson, "Lessons from the Colorado benefits management system disaster", In Advertising and Marketing Review, Oct. 2004.

Nistor, et al., "Discovering, Reporting, and Fixing Performance Bugs", In Proceedings of the 10th Working Conference on Mining Software Repositories, May 2013, pp. 237-246.

Richardson, Tim, "1901 Census site still down after six months", Jul. 3, 2002, 7 Pages.

Srivastava, et al., "ATOM: A system for building customized program analysis tools", In Proceedings of the ACM SIGPLAN conference on Programming language design and implementation, Jun. 1994, pp. 528-539.

Xu, et al., "Go with the Flow: Profiling Copies to Find Runtime Bloat", In Proceedings of the 30th ACM SIGPLAN Conference on Programming Language Design and Implementation, Jun. 2009, pp. 419-430.

Yan, et al., "Uncovering performance problems in Java applications with reference propagation profiling", In Proceedings of 34th International Conference on Software Engineering (ICSE), Jun. 2, 2012, pp. 134-144.

Zaparanuks, et al., "Algorithmic profiling", In ACM SIGPLAN Notices, Jun. 11, 2012, pp. 67-76.

Niu, et al., "Learning to Rank Code Examples for Code Search Engines", In the Journal of Empirical Software Engineering, vol. 22, Issue 1, Feb. 2017, pp. 259-291.

"International Search Report and Written Opinion Issued in PCT Application No. PCT/US21/061054", Mailed Date: Mar. 17, 2022, 12 Pages.

Communication under Rule 71(3) EPC Received for European Application No. 21835468.6, mailed on Jul. 8, 2024, 07 pages.

* cited by examiner

| f | D(f) | | URL |
|---|---|---|---|
| Method Name | Performance Features | Structural Features | |
| GetCurrentFolder | <chain> (PagedFileListResponse, Where) <chain> (Where, FirstOrDefault) | <parent> (Where, 1, ##) <parent> (Where, 1, #=#) <parent> (Where, 0, #.#) <parent> (Where, 1, #.#) <sibling> (#VAR, Where) <sibling> (Where, #VAR) <token> Where() | https://... |
| ... | ... | ... | ... |

1004

```
private void GetCurrentFolder (bool create)
{
    var id = "0";
    foreach (var p in m_path.Split (new string [] ("/")))
    {
        var el = PagedFileListResponse(id).Where (x => x.Nam == p).FirstOrDefault ();
        var el = PagedFileListResponse(id).FirstOrDefault (x => x.Name == p);
        // ...
    }
}
```

Pull Request 1006

*FIG. 10*

PERFORMANCE BUG DETECTION AND CODE RECOMMENDATION

CROSS-REFERENCE TO RELATED APPLICATIONS

The present application claims the benefit of the earlier filed provisional application having Ser. No. 63/136,376 filed on Jan. 12, 2021, which is incorporated by reference in its entirety.

BACKGROUND

A source code bug is an error in a source code program that causes the program to behave in an unintended manner, such as producing erroneous results. There are various types of source code bugs. A functional bug is one where the program fails to perform in accordance with a functional description or specification. A compiler error is a type of software bug that fails to conform to the syntax of a programming language of the program. A runtime error occurs during runtime such as logic errors, I/O errors, undefined object errors, division by zero errors, etc.

Performance bugs differ from source code bugs, such as functional bugs, compiler errors and runtime errors since they do not produce an erroneous result. By contrast, a performance bug is a programming defect that causes significant performance degradation, such as excessive resource usage, increased latency, reduced throughput, and overall degraded performance. Performance bugs are difficult to detect due to the absence of fail-stop symptoms. With the increased complexity of software systems, there is an emphasis on the efficient use of resources and hence, improvements in detecting and remedying performance bugs.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

An automated system is disclosed for detecting performance bugs in a program and for providing code recommendations to improve the performance of the program. A code recommendation is a source code snippet having similar features to other code having been previously modified to improve its performance. A code recommendation table is constructed from performance-related pull requests identified from a machine learning classifier.

The set of difference features include structural and performance features that were present in the code before changes were made ("before-code") but missing in the improved code ("after-code"). The table contains documents representing the performance-related pull requests and are indexed by a method name and a set of difference features. The features of a target method are compared with the set of difference features to find the closest similar performance-improved method from which a code recommendation is generated.

In one aspect, the methods of a source code repository are analyzed to identify those method bodies identified as likely to include a performance bug for which the system provides a code recommendation. In a second aspect, profile data is used to identify methods of a source code repository that exhibit degraded performance and those methods are analyzed to generate a code recommendation.

These and other features and advantages will be apparent from a reading of the following detailed description and a review of the associated drawings. It is to be understood that both the foregoing general description and the following detailed description are explanatory only and are not restrictive of aspects as claimed.

BRIEF DESCRIPTION OF DRAWINGS

FIG. 10 is a schematic diagram illustrating the structural and performance features extracted from the source code snippet shown in FIG. 9 and the corresponding code recommendation.

DETAILED DESCRIPTION

Overview

The subject matter disclosed pertains to an automated system for detecting performance bugs in programs and providing code recommendations to improve the program.

In one aspect, the methods of a source code repository are analyzed to identify those method bodies identified as likely to include a performance bug for which the system provides a recommendation to improve the source code of the method body. In a second aspect, profile data is used to identify methods of a source code repository that exhibit degraded performance and those methods are analyzed for a performance improvement recommendation.

A code recommendation is a source code snippet having been modified to improve its performance A code recommendation table contains performance-improved source code or code recommendations of various method bodies. The code recommendation table contains documents representing performance-improved source code extracted from the pull requests of various source code repositories. A document includes the URL of a pull request that includes the improved source code of a method body, the method name, and a set of difference features.

The code recommendation table is built from patterns discovered in the changes made to a method from pull requests that relate to a performance improvement. However, it is difficult to ascertain whether modifications made in a pull request are due to a performance bug improvement or for other reasons. To overcome this challenge, a machine learning model is used to identify whether a pull request relates to a performance bug improvement. Those pull requests identified by the machine learning model as performance-related are incorporated into the code recommendation table.

Figure 1:
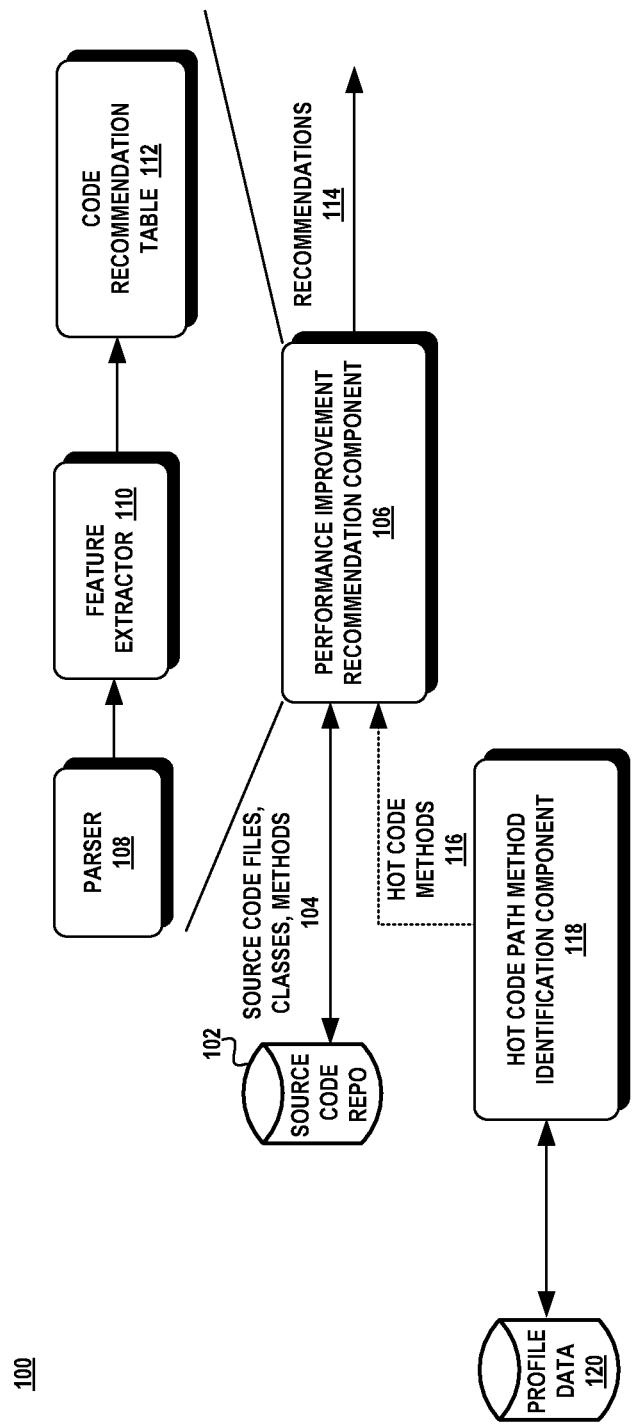
FIG. 1 illustrates an exemplary system for detecting performance bugs and for generating code recommendations.

Attention now turns to a system, device, and method of the performance improvement recommendation system.
System FIG. 1 represents an exemplary system 100 for performance bug detection and recommendation. In one aspect, the performance improvement recommendation system 100 analyzes the methods of classes in source code files 104 of a source code repository 102. The system 100 includes a performance improvement recommendation component 106 that includes a parser 108, a feature extractor 110 and a code recommendation table 112. The performance improvement recommendation component 106 outputs one or more recommendations 114.

In a second aspect, the performance improvement recommendation component 106 analyzes the hot code methods 116 identified from a hot code path method identification component 118. The hot code path method identification component 118 analyzes the profile data 120 generated during an execution of the programs of the source code repository to identify those methods that consume an abnormal amount of resource usage. The performance improvement recommendation component 106 analyzes these methods for performance improvements.

A source code repository 102 may be a file archive and web hosting facility that stores large amounts of source code either privately or publicly. A source code repository 102 can be structured as a version control system, such as GIT, Mercurial, etc. The source code files residing in the source code repository 102 vary and may be written in different programming languages. The selected source code files 104 can come from different domains, such as without limitation, scientific computing, web development, dataflow programming, machine learning, and the like.

The performance improvement recommendation component 106 uses a parser 108 to parse a method into a simplified parse tree from which structural and performance features are extracted by the feature extractor 110. The extracted features are then used to search the code recommendation table 112 for those methods that are syntactically and semantically similar. Those methods having a close similarity are then returned as recommendations 114.

Figure 2:
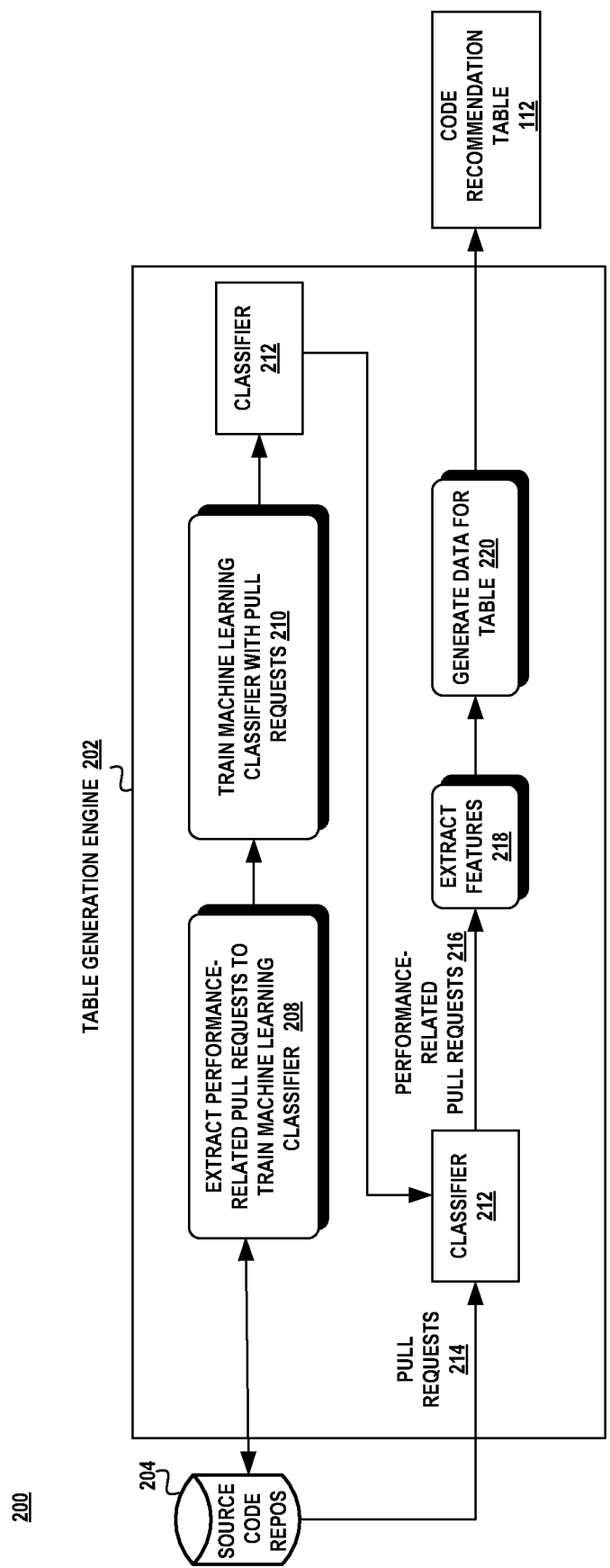
FIG. 2 illustrates an exemplary system for generating the code recommendation table.

Attention now turns to a description of the system 200 used to construct the recommendation table 112. Turning to FIG. 2, there is a table generation engine 202 that extracts data from various source code repositories 204. The table generation engine 202 extracts performance-related pull requests 208 from a source code repository 204, extracts features from these pull requests, and uses the features to train a machine learning classifier to learn to identify a performance-related pull request 210. The machine learning classifier 212 is then used to identify performance-related pull requests 216 from pull-requests 214 from a source code repository 204. Features are extracted from the performance-related pull requests 218 to construct the code recommendation table 220.

Figure 3:
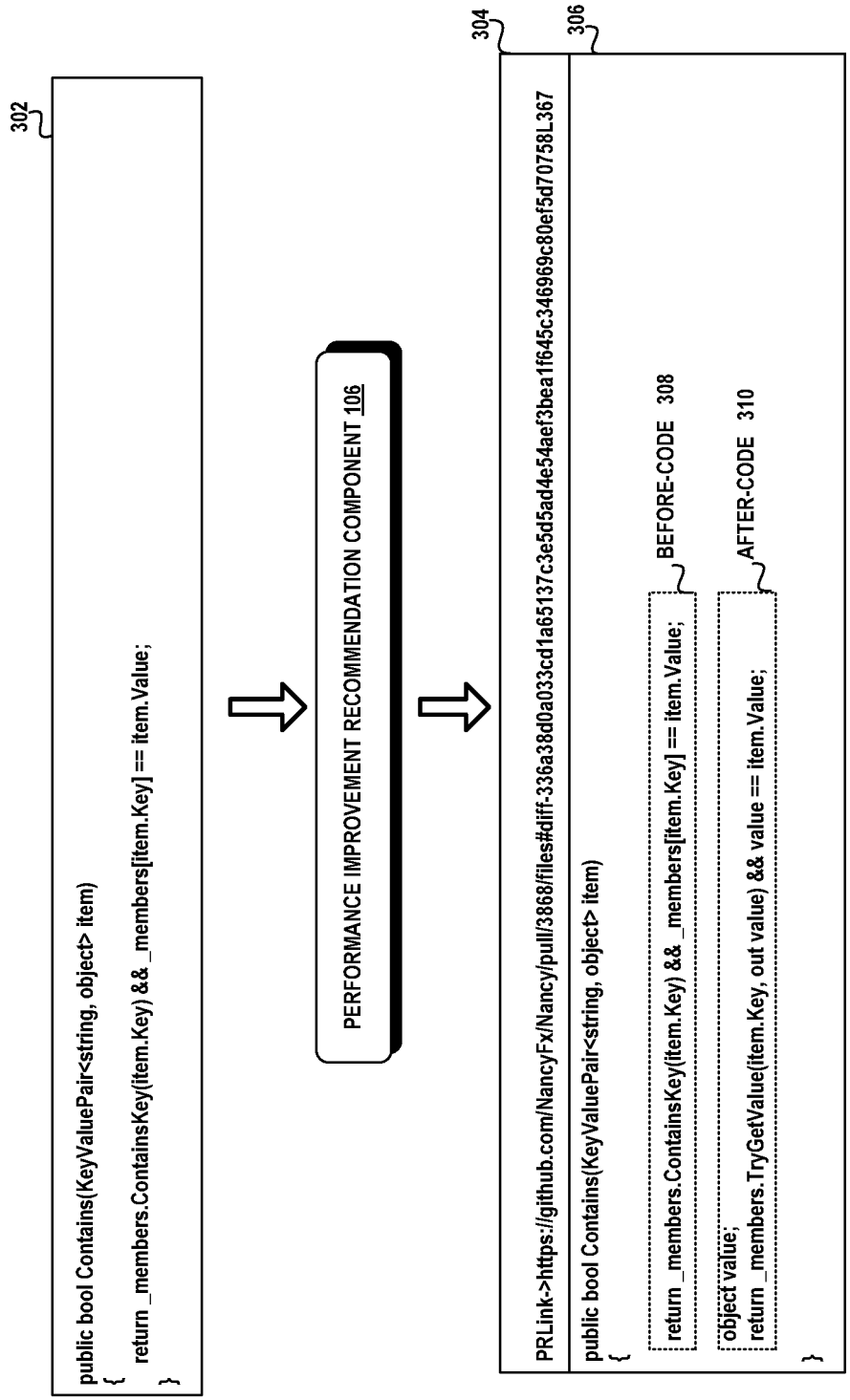
FIG. 3 is a schematic diagram illustrating the performance improvement recommendation system.

Attention now turns to FIG. 3, which illustrates the output of the performance improvement recommendation system. The source code for the method body of the method Contains 302 is extracted from a source code repository. The performance improvement recommendation component 106 parses the method into a simplified parse tree and extracts features which are used to search the code recommendation table for similar code. The recommendation that is output contains a URL 304 to a pull request of a similar method having improved source code. In addition, a source code snippet 306 is returned showing the before-code 308 and the after-code 310.

In this particular case, the improved source code 306 includes the source code statement, return_members.ContainsKey(item.Key)&&_members[item.Key]==item. Value;, from the before-code and source code statements made in the after-code object value; return_members.TryGetValue(item.key, out value)&& value==item. Value.

The before-code makes two separate lookups into the dictionary, _member. One lookup is to check if an item exists in the dictionary, ContainsKey, and the second lookup is to retrieve the item, _members[item.Key]. The improved code is more efficient since it performs both operations at once using the TryGetValue method.
Methods.

Attention now turns to a description of the various exemplary methods that utilize the system and devices disclosed herein. Operations for the aspects may be further described with reference to various exemplary methods. It may be appreciated that the representative methods do not necessarily have to be executed in the order presented, or in any particular order, unless otherwise indicated. Moreover, various activities described with respect to the methods can be executed in serial or parallel fashion, or any combination of serial and parallel operations. In one or more aspects, the method illustrates operations for the systems and devices disclosed herein.

Figure 4:
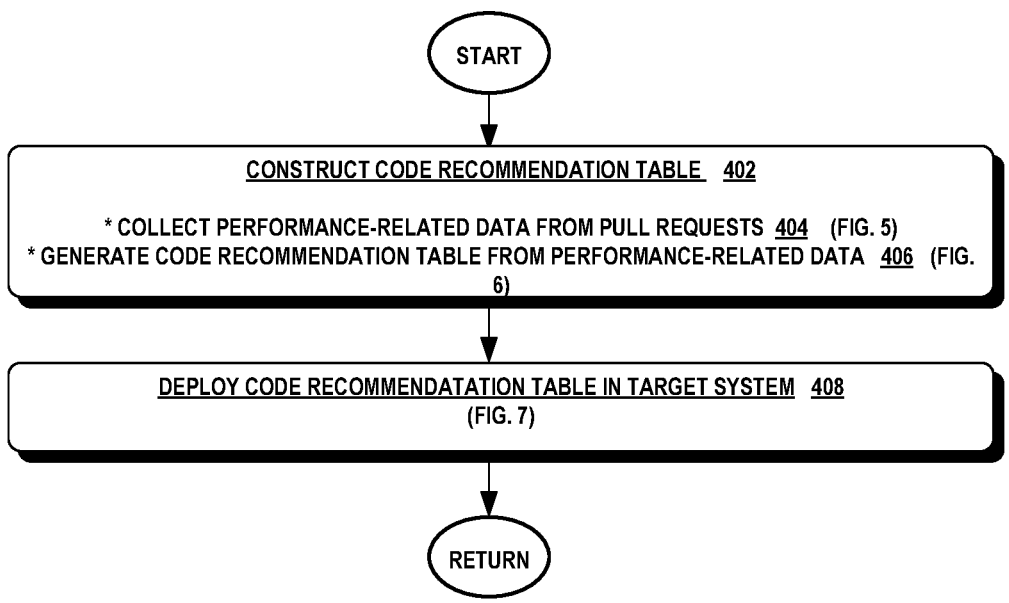
FIG. 4 is a flow diagram illustrating an exemplary method for performance bug detection and code recommendation.

Turning to FIG. 4, there is shown a method 400 of a performance improvement recommendation system that constructs a code recommendation table (block 402) from performance-related data extracted from pull requests (block 404). The extracted performance-related data is then used to construct the code recommendation table (block 406). Upon completion of the construction of the code recommendation table, the code recommendation table is deployed in a target system (block 408).

In one aspect, the performance improvement recommendation system may be deployed in an IDE to show warnings during an edit session or during compilation. A pop-up window may appear to suggest the code recommendation. In another aspect, the performance improvement recommendation system may be used in a version-controlled source code repository, such as GIT, to provide a code recommendation in the form of comments on pull requests when developers submit changes.

Figure 5:
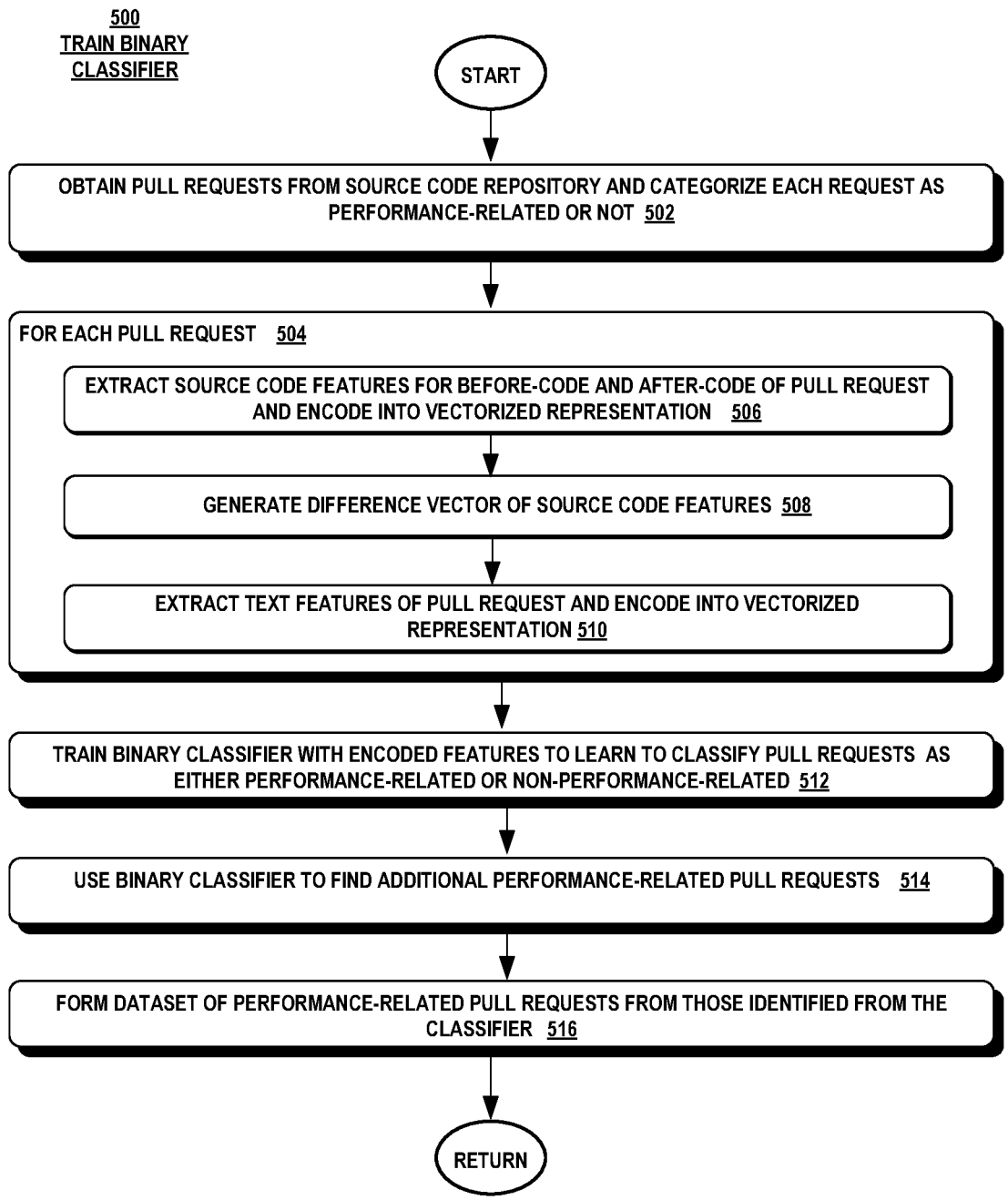
FIG. 5 is flow diagram illustrating an exemplary method for training the binary classifier.

Turning to FIG. 5, there is shown an exemplary method 500 for identifying performance-related pull requests that are then used to generate the code recommendation table. A pull request is an operation in a version-controlled source code repository that requests an assigned person to review changes made to a code base before the changes are merged. The pull request includes a comment section, a title, a description, the before-code and the after-code. In the description, the author of the pull request typically describes the changes made to the code. In the comment section, developers add in comments regarding the proposed change. A pull request is composed of one or more commits A commit is an individual change to a file or set of files.

Initially, various source code repositories are mined to find performance-related pull requests. In one aspect, source code repositories having more than 100 stars on GitHub are selected. Pull requests from these source code repositories are selected by searching for certain keywords in the title, description, commit text or comment section of a pull request. The keywords used to select pull requests as being performance-related include "perf", "performance", "latency", "slow", "optimize", "allocation", "speed", "latency", "cache", "usage", "unnecessary", etc. These pull requests are then manually classified as being performance-related and other pull requests not containing these keywords are manually classified as not being performance related. A dataset consisting of labeled performance-related pull requests and non-related pull requests is selected for training a machine learning binary classifier (Collectively, block 502).

For each pull request in the dataset (block 504), specific source code features and text features are extracted from the pull request. The before-code and the after-code of each pull request is parsed and tokenized into a sequence of tokens that includes function names, variable names and keywords (e.g., if, for, while) of the programming language of the source code. The sequence of tokens of the before-code is converted into a vectorized representation or encoding and the sequence of tokens of the after-code is converted into a vectorized representation or encoding (block 506). The difference between the before-code encoding and the after-code encoding is formed into a difference vector that is used to train the binary classifier (block 508).

The text features of a pull request include the title and description which are vectorized using a Term Frequency-Inverse Document Frequency (TF-IDF) score. The TF-IDF score applies a weighted average to each word and measures the relevance of the word rather than its frequency. TF-IDF is a function that assigns a weight for each word in a document based on the frequency the word appears in the document. A word has a higher weight if it is used often but if the word is used too frequently, the weight applies a penalty to the word embedding. Each word's TF-IDF score is normalized into an embedding and then input to train the binary classifier. (Collectively, block 510).

The source code difference embedding and the embedding of the text features is used to train a machine learning binary classifier. The binary classifier is trained on a semi-supervised training dataset in multiple iterations. The classifier is trained initially on a supervised set of pull requests that are manually labeled. The classifier is then trained on an unsupervised set of pull requests. Additional pull requests are manually labeled and used to train the binary classifier. This process is repeated for the classifier to learn new code and text patterns over the course of different iterations. (Collectively, block 512).

In one aspect, a random forest classifier is trained to learn to predict whether a pull request is performance-related or not. A random forest is an ensemble-based machine learning technique for classification. This technique is constructed using multiple decision trees that are trained to produce a probability representing a classification or label identifying the class that represents the mode of the classes of the decision trees. A mode is the value in the training dataset that appears most frequently.

A random forest model M consists of a fixed number of decision trees, T, that vote to predict a classification on unseen data Each decision tree consists of a root node, multiple internal nodes referred to as split nodes, and multiple leaf nodes. Each root and split node of each tree performs a binary test on each input training data or feature vector and performs a binary test on the result, directs the data to the left or right child node. The leaf nodes store a probability distribution.

Each node in a decision tree i provides a probability $p_i$ (y|x) for each y∈L, which is obtained during training the random forest, where y is a label out of the available labels L, and x represents a feature vector of n features. The label indicated performance-related or non-performance-related. The final classification is obtained from a vote of all the trees, T, and the resulting label is assigned according to the following equation:

$$M(x) = \mathrm{argmax}_{y \in L} \frac{1}{T} \sum_{i=1}^{T} p_i(y \mid x).$$

This method of combining trees is an ensemble method. The individual decision trees are weak learners and the ensemble produces a strong learner. Decision trees can suffer from over-fitting which leads to poor generalization and a higher error rate. An ensemble of decision trees, such as a random forest, improves generalization.

Once the binary classifier is trained, the binary classifier is used to identify other performance-related pull requests from additional source code repositories (block 514). The performance-related pull requests are then used to construct the code recommendation table (block 516).

Figure 6:
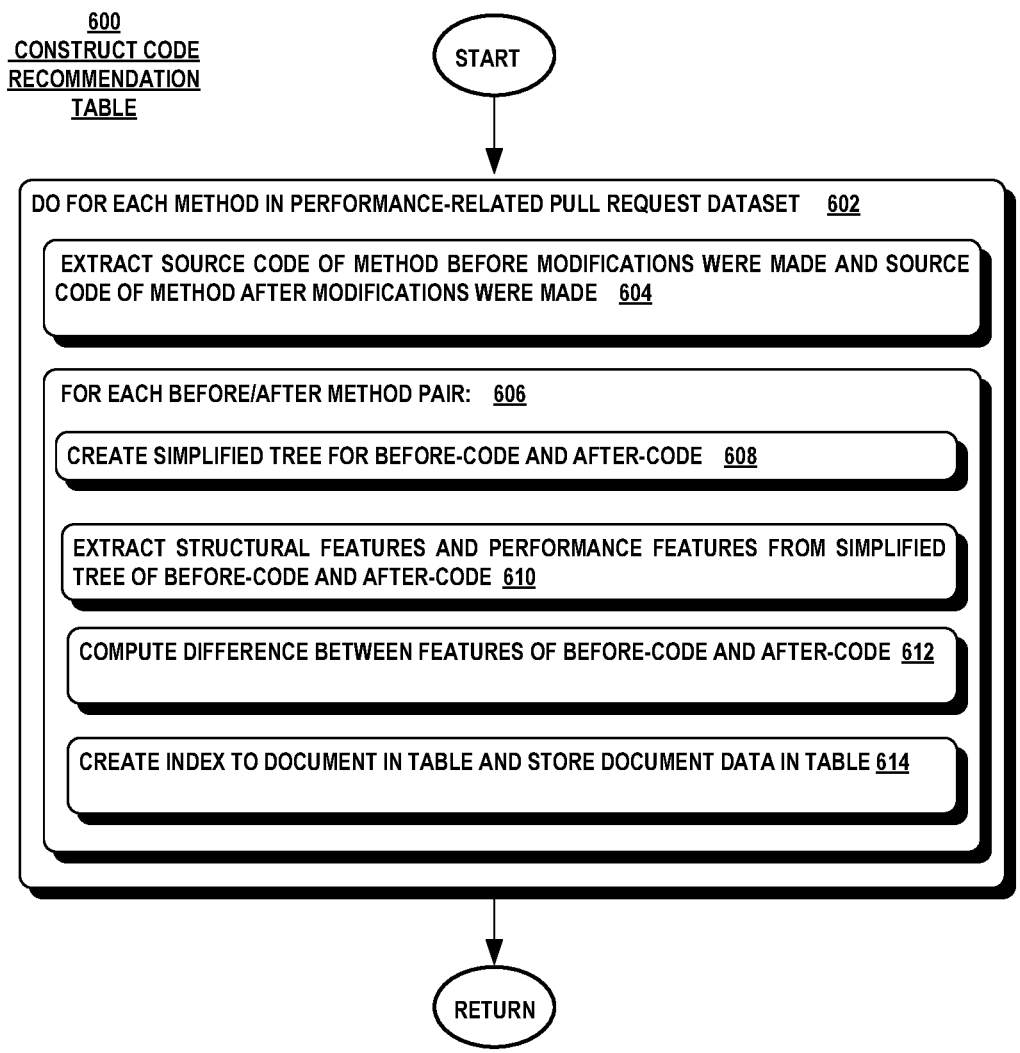
FIG. 6 is a flow diagram illustrating an exemplary method for constructing the code recommendation table.

Turning to FIG. 6, there is shown an exemplary method 600 for generating the code recommendation table from the performance-related pull requests. The method analyzes each performance-related pull request (block 602) to extract the source code of the method subject to the pull request before the modifications were made ("before-code") and the source code of the method subject to the pull request with the modifications ("after-code") (block 604).

For each before-code and after-code method pair (block 606), a simplified parse tree is generated for the before-code and for the after-code (block 608). A simplified parse tree is a data structure having a format that is universal to all programming languages. A simplified parse tree is used to represent a program. The simplified parse tree is constructed from parsing the source code of a method body into a parse tree. The simplified parse tree is traversed to replace non-keyword tokens with the symbol "#" and the keyword tokens with a label, such as the value of the token. Keyword tokens are language-specific tokens and symbols, such as while, if, else, "+", "*", etc. A non-keyword token is not a keyword token and includes variable names, method names, field names, and literals.

Structural and performance features are extracted from the simplified parse tree of the before-code and from the simplified parse tree of the after-code (block 610). A structural feature pertains to a non-keyword token and includes token features, parent features, sibling features, and variable usage features. A token feature is a label representing a non-keyword token and is of the form n or #VAR, if n is a local variable. Parent features take the form (token, $i_1$, parent), (token, $i_2$, grand-parent), (token, $i_2$, great-grand-parent), where $i_1$ is the index of the token in its parent's list of children, $i_2$ is the index of the token in its grand-parent's list of children, and $i_3$ is the index of the grand-parent in great-grand-parent's list of children.

Sibling features are of the form (token, next token) and (previous token, token) where previous token and next token are the previous and next non-keyword tokens in the program relative to the token without any intervening non-keyword tokens. Variable usage features pertain to tokens representing usages of local variables in the program. A variable usage features takes the form (Context (previous usage token), Context (token)) and (Context(token), Context (new usage token)).

For a non-keyword token n, Context (n) is defined as the tuple (i, p), where p is the parent of n and i is the index of n in p's list of children, if the label of p is not #.#, otherwise, Context (n) is the first non-keyword token after n in the program that is not a local variable.

It should be noted that the term method and function are used interchangeably.

Performance features are designed to capture the performance-related characteristics of a code snippet and include chain invocation features, nested function call features, repeat function call features, definition and use features, and member access features.

A chain invocation feature is only defined for tokens representing functions in the program. It is of the form (function token, next function token) where these tokens are ordered pairs of consecutive methods that are chained in a single statement.

A nested function call feature is only defined for tokens representing functions in the program. A nested function call is of the form (function token, nested function token), where the first token is a non-keyword token associated with a function call and the second is the non-keyword token for a function that gets called from the argument list of the first function.

A repeat function call feature is only defined for tokens representing functions in the program. It is of the form (function token, invocation expression) and repeated as often as the maximum number of times the same invocation with the same set of parameters can be found on any possible path through the control flow graph within the method.

A definition and use feature is only defined for tokens representing variables in the program. It is of the form (function token, usage token), where the first token is the identifier of the function call used in the last assignment to a variable and the second token is the identifier of the variable's member function/property that is accessed. This captures information regarding the type of variable and how it gets used.

A member access feature is only defined for tokens representing variables in the program. It is of the form (usage token, next usage token), where the two tokens are the identifiers associated with the variable members that are accessed in these two usages.

Next, the difference in the features of the before-code and the after-code, is computed as follows (block 612). The before-code of a method is represented as $f_b$ and the after-code of the method is represented as $f_a$. Let $F(f_b)$ represent the features extracted from the before-code and $F(f_a)$ represent the features extracted from the after-code. D(f) represents the difference between the features extracted from the before-code that are not in the features extracted from the after-code and is represented mathematically as, $D(f)=\{x \in F(f_b) | m_b(x) < m_a(x)\}$, where $m_b(x)$ and $m_a(x)$ represent the counts of feature x in multi-sets $F(f_b)$ and $F(f_a)$ respectively. If feature x is not present in a multi-set, function m would return 0.

An index is created for each document or entry in the code recommendation table. The index includes a method name and a set of feature differences. The document entry includes the method name, URL of the after-code, and the set of feature differences, D(f). D(f) is the set of structural and performance features in the before-code that are missing in the after-code. (Collectively, block 614).

Figure 7:
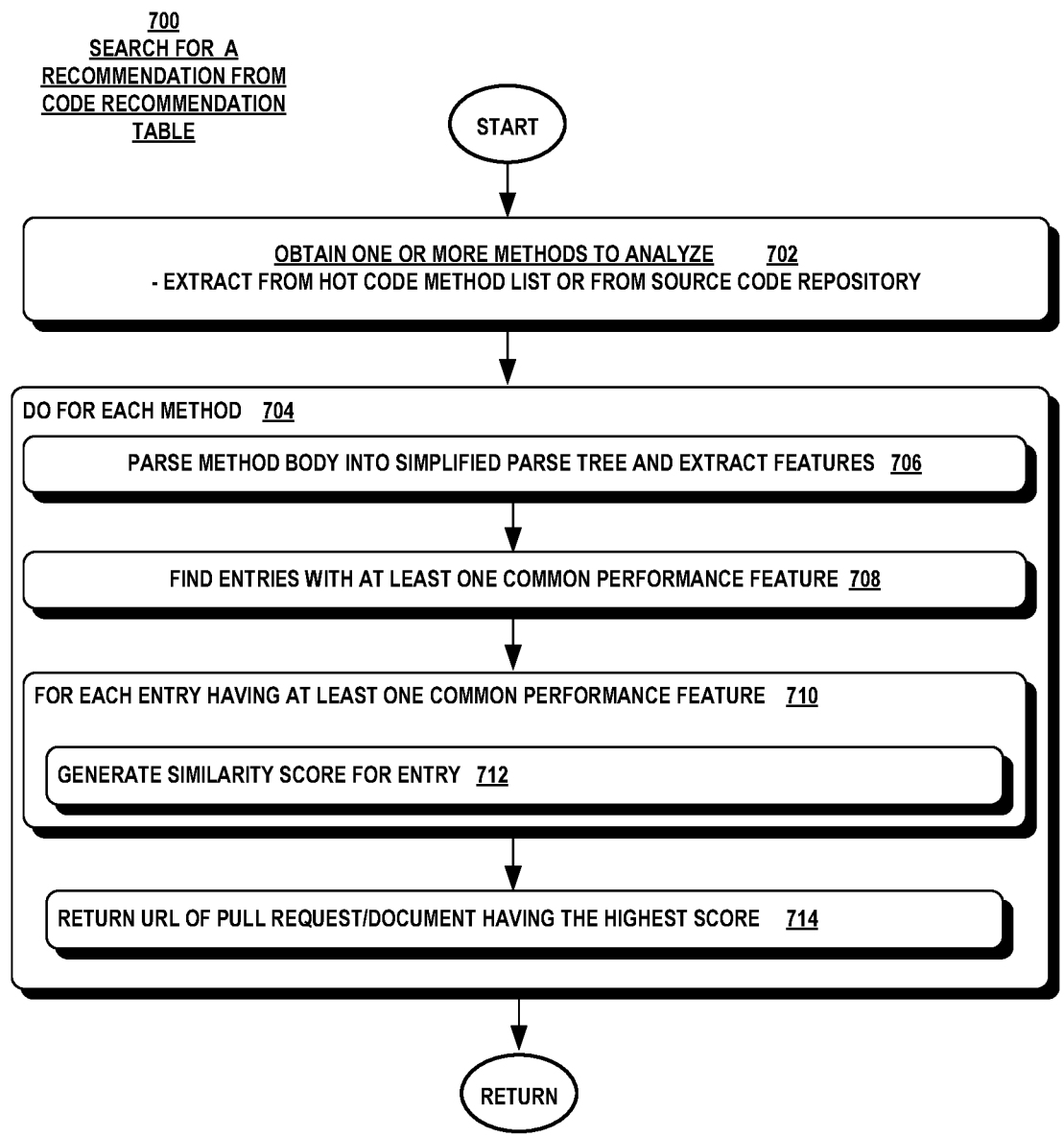
FIG. 7 is a flow diagram illustrating an exemplary method for searching for code recommendations in the code recommendation table.

Attention now turns to FIG. 7 which illustrates a method 700 for searching the recommendation table for a code recommendation. The performance improvement recommendation component 106 receives one or more methods to analyze (block 702). The performance improvement recommendation component 106 may analyze each method in each class used in the files of a source code repository or receive hot code methods to analyze from the hot code path method identification component 118 (block 702).

Figure 8:
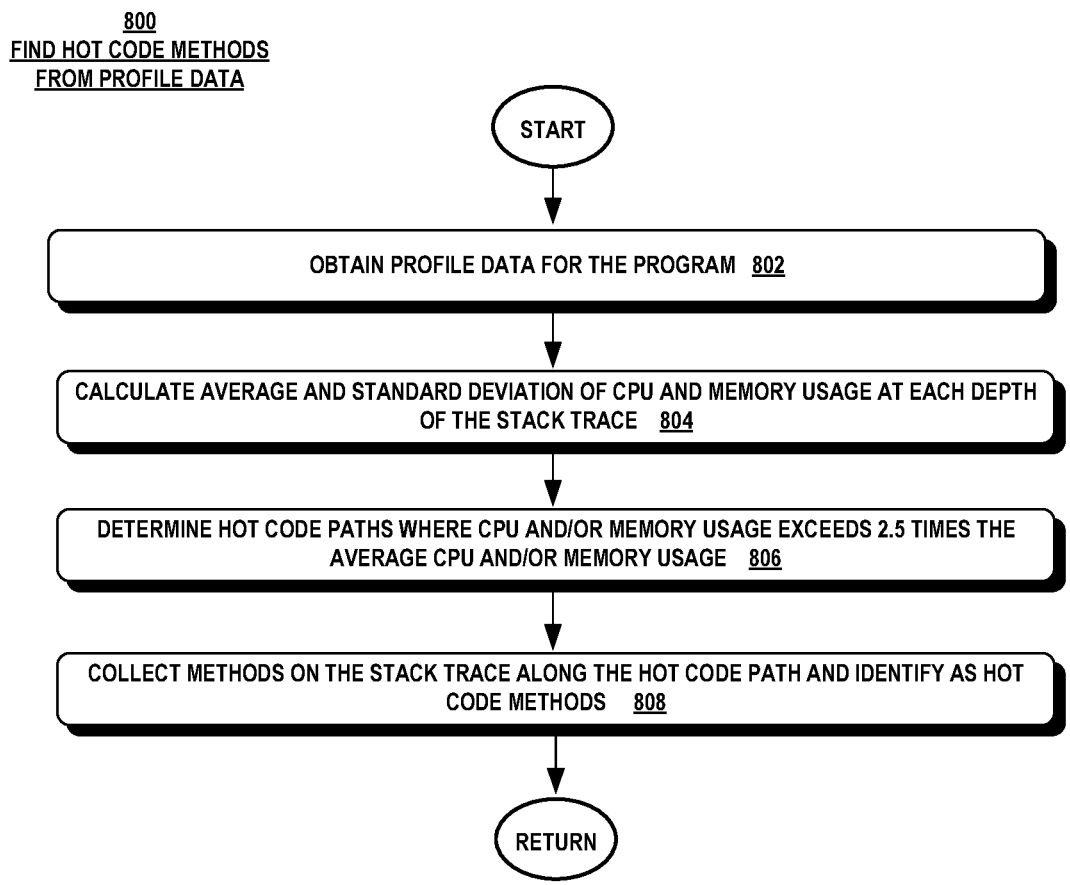
FIG. 8 is a flow diagram illustrating an exemplary method for identifying hot code methods from profile data.

Turning to FIG. 8, there is shown a method 800 for identifying hot code methods from profile data. Performance monitoring is often performed by performance profilers. In one aspect, a sampling profiler runs a program without any runtime modifications and outside of the program's process. One type of sampling profiler is the Event Tracing for Windows (ETW) which logs Windows kernel and application-specific events. This profiler samples the instruction pointer of each machine's CPU every millisecond. Each sample captures the complete call stack of the thread that is currently executing at periodic intervals.

The profile data of a program is obtained (block 802) and analyzed to calculate the average and standard deviation of the CPU and memory usage at each depth of the stack trace (block 804). The depth of the stack trace is the level in the stack from the top of the trace. Hot code execution paths are identified that consume the most execution time and/or are executed most frequently (block 806). In one aspect, a host code execution path is one where the CPU and memory usage exceeds 2.5 times of the average and standard deviation of the CPU and memory usage of the execution paths in the program (block 806). The methods on the identified host code execution path are then identified as hot code methods and subject to analysis for performance bug improvements (block 808).

Turning back to FIG. 7, for each method that is analyzed (block 704), the method (i.e., method signature and method body) is parsed into a simplified parse tree from which structural and performance features are extracted (block 706). A search index is generated for the method including the method name and a set of difference features (block 708).

The table recommendation engine 202 uses the search index to find those entries that have at least one performance feature in common with the target method (block 708). For those methods having at least one common performance feature (block 710), the table recommendation engine 202 computes a similarity score for those entries. The score is the ratio of the number of features common to both the target method and the entry over the total number of features of the entry. The score is represented mathematically as:

$$\text{Score}(f_q, d) = \frac{|d \cap F(fq)|}{|d|},$$

where $f_q$ represents the target function being analyzed, d is the entry in the recommendation table, $F(f_q)$ is the set of features of the target function, |d| is the cardinality of the features in the entry, and $|d \cap F(f_q)|$ is the cardinality of the features that are in both the target method and the entry. (Collectively, block 712).

If an entry is found having a high similarity score, the method is reported as having a performance bug. The entries with a high similarity score, relative to a threshold, are then selected as code recommendations and returned in a ranked order with the highest scored entry first. The code recommendation includes a URL of the pull request having the improved code and a method body with the improved code. (Collectively, block 714).

Figure 9:
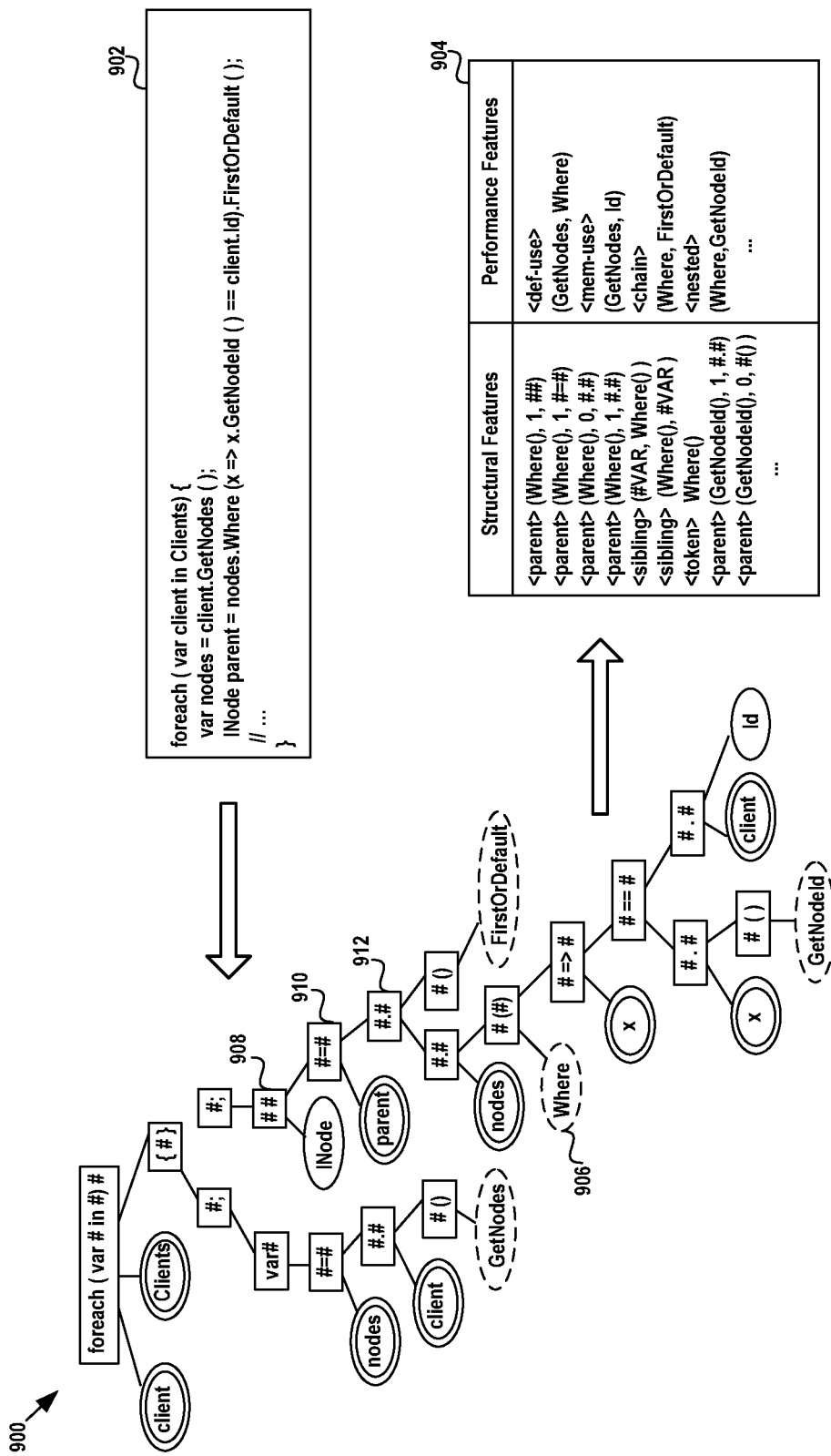
FIG. 9 is a schematic diagram illustrating a source code snippet and a corresponding simplified parse tree.

Attention now turns to an exemplary illustration of the code recommendation process. Turning to FIG. 9, there is shown an exemplary code snippet 902, a corresponding simplified parse tree 904, and a partial list of the structural and performance features of the code snippet. The code snippet 902 is a method (i.e., function) written in the C# programming language.

The simplified parse tree is a representation of the structure or syntax of the code snippet and includes nodes and branches. There is one root node, internal nodes, and leaf nodes. Nodes can be parent nodes and/or child nodes. A parent node has at least one branch emanating from it and a child node has at least one parent node. A node is a non-keyword token, a keyword token or a simplified parse tree. A keyword token is the set of all tokens of a programming language that part of the grammar of the language, such as operator symbols and keyword names. Non-keyword tokens are variable names, method names, field names, and literals.

The label of a simplified parse tree is the concatenation of all the nodes representing the tree where the value of a keyword token is used for concatenation and where the hash symbol "#" is used for concatenation of non-keyword tokens and simplified parse trees.

As shown in FIG. 9, source code snippet 902 is transformed into a simplified parse tree 900 from which structural and performance features 904 are extracted. The structural features include parent, sibling, and token features. The numerals in the parent feature represent the subtree of the parent node as follows: "0" is the first child subtree, "1" is the second child subtree and "2" is the third child subtree).

For example, the parent feature "<parent> (Where ( ), 1, ##)" represents that the method/function Where is part of the second child subtree of the node 908, where "##" represents the concatenation of two simplified parse trees. The parent feature "<parent> (Where ( ), 1, #=#)" represents that the method/function Where is part of the second child subtree of the node 910, where "#=#" represents the concatenation of two subtrees by the operator "=". The sibling feature "<sibling>#VAR Where( )" represents that the left sibling of the method/function Where( ) is a local variable, where #VAR represents a local variable. The sibling feature "<sibling> Where( )#VAR" represents that the right sibling of the method/function of Where ( ) is a local variable.

The performance features 904 include a definition & use feature ("<def-use>"), a member access feature ("<mem-use>"), a chain feature ("<chain>"), and a nested feature ("<nested>"). The <def-use> feature represents the definition of the simplified variable nodes in the method/function GetNodes which is used in the method/function Where. The <mem-use> feature represents that field Id is accessed by the method GetNodes. The <chain> feature represents the invocation of the Where and FirstOrDefault functions chained in a single statement. The <nested> feature represents that the GetNodeId method is invoked within the Where method.

Turning to FIGS. 9 and 10, there is shown a portion of a code recommendation table 1004 having a document that is predicted to be closely-similar to source code snippet 902. The document pertains to the method, GetCurrentFolder, which has at least one performance feature in common with source code snippet 902, which is <chain> (Where, FirstOrDefault). The score computed for GetCurrentFolder is based on the ratio of the number of common structural and performance features in both source code snippet 902 and in GetCurrentFolder over the number of features in GetCurrentFolder. When the score exceeds a similarity threshold, such as greater than 80%, the URL of the pull request associated with GetCurrentFolder is returned in addition to the source code of GetCurrentFolder.

The performance issue with source code snippet 902 is the statement INode parent=nodes.Where (x=>x, GetNodeId ( )==client.Id).FirstOrDefault ( ) The invocation of the Where method with the expression, x=>x, GetNodeId ( )==client.Id, first filters the list down to only those entries that satisfy the query and retrieves the first element. The improved code stops when the first entry is encountered that satisfies the expression, FirstOrDefault (x=>x.Name=p) instead of iterating over the entire list.

Exemplary Operating Environment

Figure 11:
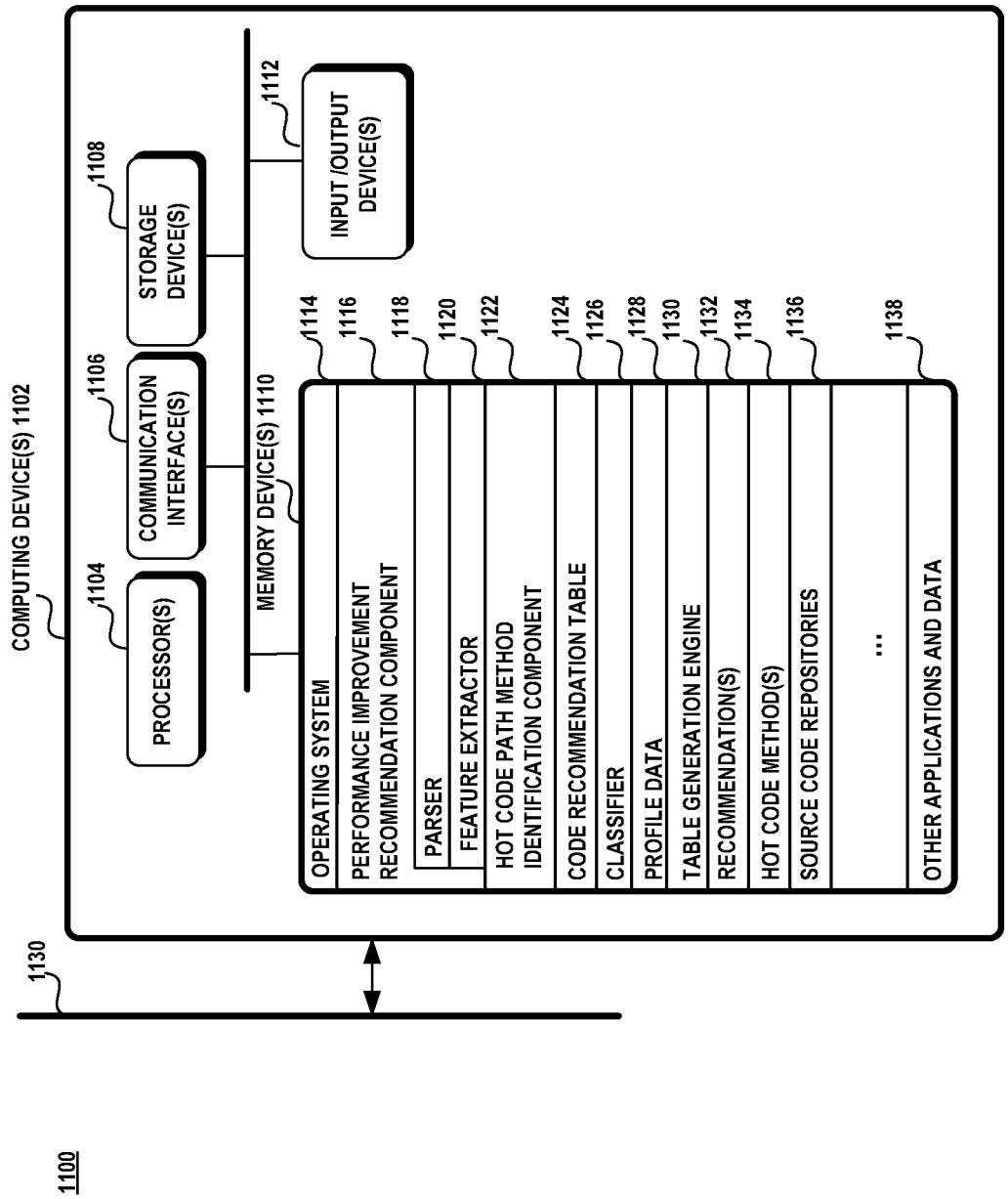
FIG. 11 is a block diagram illustrating an exemplary operating environment.

Attention now turns to a discussion of an exemplary operating environment. FIG. 11 illustrates an exemplary operating environment 1100 in which one or more computing devices 1102 are used to generate the code recommendation table and utilize the code recommendation table to improve methods of a program. However, it should be noted that the aspects disclosed herein is not constrained to any particular configuration of devices. Computing devices 1102 may be configured as a cloud service that generates the code recommendation table for deployment into an integrated development environment (IDE) or version-controlled source code repository. It should be noted that the operating environment is not limited to any particular configuration and other configurations are possible.

A computing device 1102 may be any type of electronic device, such as, without limitation, a mobile device, a personal digital assistant, a mobile computing device, a smart phone, a cellular telephone, a handheld computer, a server, a server array or server farm, a web server, a network server, a blade server, an Internet server, a work station, a mini-computer, a mainframe computer, a supercomputer, a network appliance, a web appliance, a distributed computing system, multiprocessor systems, or combination thereof. The operating environment 1100 may be configured in a network environment, a distributed environment, a multi-processor environment, or a stand-alone computing device having access to remote or local storage devices.

The computing device 1102 may include one or more processors 1104, one or more communication interfaces 1106, one or more storage devices 1108, one or more input/output devices 1112, and one or more memory devices 1110. A processor 1104 may be any commercially available or customized processor and may include dual microprocessors and multi-processor architectures. A communication interface 1106 facilitates wired or wireless communications between the computing device 1102 and other devices. A storage device 1108 may be computer-readable medium that does not contain propagating signals, such as modulated data signals transmitted through a carrier wave. Examples of a storage device 1108 include without limitation RAM, ROM, EEPROM, flash memory or other memory technology, CD-ROM, digital versatile disks (DVD), or other optical storage, magnetic cassettes, magnetic tape, magnetic disk storage, all of which do not contain propagating signals, such as modulated data signals transmitted through a carrier wave. There may be multiple storage devices 1108 in the computing device 1102. The input/output devices 1112 may include a keyboard, mouse, pen, voice input device, touch input device, display, speakers, printers, etc., and any combination thereof.

A memory device or memory 1110 may be any non-transitory computer-readable storage media that may store executable procedures, applications, and data. The computer-readable storage media does not pertain to propagated signals, such as modulated data signals transmitted through a carrier wave. It may be any type of non-transitory memory device (e.g., random access memory, read-only memory, etc.), magnetic storage, volatile storage, non-volatile storage, optical storage, DVD, CD, floppy disk drive, etc. that does not pertain to propagated signals, such as modulated data signals transmitted through a carrier wave. A memory device 1110 may also include one or more external storage devices or remotely located storage devices that do not pertain to propagated signals, such as modulated data signals transmitted through a carrier wave.

The memory device 1110 may contain instructions, components, and data. A component is a software program that performs a specific function and is otherwise known as a module, program, component, and/or application. The memory device 1110 may include an operating system 1114, performance improvement recommendation component 1116 including a parser 1118 and a feature extractor 1120, a hot code path method identification component 1122, a code recommendation table 1124, a classifier 1126, profile data 1128, table generation engine 1130, recommendation(s) 1132, hot code method(s) 1134, source code repositories 1136, other applications and data 1138.

The computing devices 1102 may be communicatively coupled via a network 1130. The network 1130 may be configured as an ad hoc network, an intranet, an extranet, a virtual private network (VPN), a local area network (LAN), a wireless LAN (WLAN), a wide area network (WAN), a wireless WAN (WWAN), a metropolitan network (MAN), the Internet, a portions of the Public Switched Telephone Network (PSTN), plain old telephone service (POTS) network, a wireless network, a WiFi® network, or any other type of network or combination of networks.

The network 1130 may employ a variety of wired and/or wireless communication protocols and/or technologies. Various generations of different communication protocols and/or technologies that may be employed by a network may include, without limitation, Global System for Mobile Communication (GSM), General Packet Radio Services (GPRS), Enhanced Data GSM Environment (EDGE), Code Division Multiple Access (CDMA), Wideband Code Division Multiple Access (W-CDMA), Code Division Multiple Access 2000, (CDMA-2000), High Speed Downlink Packet Access (HSDPA), Long Term Evolution (LTE), Universal Mobile Telecommunications System (UMTS), Evolution-Data Optimized (Ev-DO), Worldwide Interoperability for Microwave Access (WiMax), Time Division Multiple Access (TDMA), Orthogonal Frequency Division Multiplexing (OFDM), Ultra Wide Band (UWB), Wireless Application Protocol (WAP), User Datagram Protocol (UDP), Transmission Control Protocol/Internet Protocol (TCP/IP), any portion of the Open Systems Interconnection (OSI) model protocols, Session Initiated Protocol/Real-Time Transport Protocol (SIP/RTP), Short Message Service (SMS), Multimedia Messaging Service (MMS), or any other communication protocols and/or technologies.

Technical Effect

Aspects of the subject matter disclosed herein pertain to the technical problem of detecting performance bugs in a target source code snippet based on performance and structural features of a source code program. The performance and structural features of performance-improved code are used to learn the syntax and semantics in a source code program that are related to performance-related issues in source code, such as performance bugs. The performance features capture information about the code's runtime performance. The structural features represent the syntax and semantics of the source code.

The technical features associated with addressing this problem includes a machine learning classifier trained to identify performance-related pull requests from a semi-supervised set of training data, a set of difference features, and a hot code detection technique.

The machine learning classifier is able to more accurately identify performance-improved source code from pull requests. The classifier-identified performance-related pull requests are included in a code recommendation table indexed by a set of difference features.

The set of difference features are the structural and performance features of the source code before performance improvements were made to the source code. The set of difference features are used to understand the performance improvements made to a source code snippet.

The difference features of a target source code snippet closely matching the difference features of a performance-improved code snippet are used to identify that the source code snippet needs performance-related improvements. This identification is made by using features that existed in the before-code but missing from the improved code. Hence, the difference features more accurately identify those source code snippets needing a performance improvement and the code recommendation or suggestion for improving the source code snippet.

The use of the profile data of a source code program more accurately identifies those methods of the program having potential performance-related issues.

Conclusion

A system is disclosed comprising one or more processors and a memory. The memory stores one or more programs that are configured to be executed by the one or more processors. The one or more programs including instructions to perform acts that: obtain a query having a target source code snippet; extract structural features and performance features from the target source code snippet; access a code recommendation table, the code recommendation table including a plurality of documents, a document associated with a performance-improved source code snippet, the code recommendation table indexed by a set of difference features of the performance-improved source code snippet, the set of difference features including structural features and performance features of before-code of the performance-improved source code snippet; search for documents in the code recommendation table having at least one performance feature matching at least one performance feature of the target source code snippet; compute a score for each document having at least one matching feature in the code recommendation table based on the structural features and performance features of the target source code snippet and the set of difference features of a document; and generate a code recommendation for the target source code snippet based on a performance-improved source code snippet having a highest score.

In an aspect, the one or more programs including instructions to perform acts that: parse the target source code snippet into a simplified parse tree; and extract the structural features and performance features of the target source code snippet from the simplified parse tree. In an aspect, each document is associated with a Uniform Resource Locator of a pull request including the performance-improved source code snippet. In an aspect, the structural features include a token feature, one or more parent features, one or more sibling features, and/or one or more variable usage features.

In an aspect, the performance features include a chain invocation feature, a nested function call feature, a repeat function call feature, a definition and use feature, and/or a member access feature. In an aspect, the score is computed as a ratio of a number of common structural features and performance features of the target source code snippet with the set of difference features of a document over a number of structural features and performance features of a document. In an aspect, the target source code snippet is a hot code method identified from profile data of a program including the target source code snippet. In an aspect, the one or more programs including instructions to perform acts that: generate a code recommendation for the target source code snippet for each performance-improved source code snippet having a score that exceeds a threshold.

A method is disclosed that is performed on a computing device having a processor and a memory. The method, comprises: classifying pull requests from a source code repository using a binary classifier as performance-related or non-performance-related, a performance-related pull request identifying a performance bug in a related source code snippet; constructing a code recommendation table from the performance-related pull requests, the code recommendation table including a plurality of Uniform Resource Locators ("URLs"), each of the plurality of URLs associated with a performance-related pull request and associated with structural and performance features of before-code of the performance-related pull request; searching the code recommendation table for a URL associated with structural and performance features closely matching structural and performance features of a target source code snippet; and generating a code recommendation for the target source code snippet from the URL associated with the closest matching structural and performance features as the target source code snippet.

In an aspect, searching the code recommendation table further comprises: parsing the target source code snippet into a simplified parse tree; and extracting the structural and performance features from the simplified parse tree. In an aspect, the structural and performance features associated with a URL represent structural and performance features in before-code of a performance-improved pull request but missing in after-code of the performance-improved pull request. In an aspect, the method further comprises: obtaining profile data of a program; and identifying, from the profile data, the target source code snippet as a method of a program having excessive CPU and/or memory usage.

In an aspect, the method further comprises: training the binary classifier on text features and source code features of pull requests labeled as performance-related and non-performance-related. In an aspect, the structural features include a token feature, one or more parent features, one or more sibling features, and/or one or more variable usage features. In an aspect, the performance features include a chain invocation feature, a nested function call feature, a repeat function call feature, a definition and use feature, and/or a member access feature.

A device is disclosed comprising at least one processor and a memory. The at least one processor is configured to execute instructions stored in the memory that perform acts that: obtain a plurality of pull requests from a version-controlled source code repository, the pull request includes before-code and after-code of a source code snippet; label each of the plurality of pull requests as performance-related or non-performance-related, wherein a performance-related pull request is associated with a performance bug; train a binary classifier with the plurality of pull requests to learn to classify unlabeled pull requests as performance-related or non-performance-related; use the binary classifier to classify a plurality of performance-related pull requests; and construct a code recommendation table from the classified performance-related pull requests, each entry in the code recommendation table indexed by a set of difference features, the set of difference features including structural and performance features of before-code of the pull request not present in structural and performance features of after-code of the pull request, each entry in the code recommendation table including a Uniform Resource Locator (URL) of a classified performance-related pull request.

In an aspect, the at least one processor is configured to execute instructions stored in the memory that perform acts that: search the code recommendation table for a set of difference features closely matching structural and performance features of a target source code snippet; and identify the target source code snippet as having a performance bug upon finding a close match in the code recommendation table.

In an aspect, the at least one processor is configured to execute instructions stored in the memory that perform acts that: generate an improved source code snippet for the target source code snippet based on the URL associated with the matching set of difference features. In an aspect, the structural features include a token feature, one or more parent features, one or more sibling features, and/or one or more variable usage features. In an aspect, the performance features include a chain invocation feature, a nested function call feature, a repeat function call feature, a definition and use feature, and/or a member access feature.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It may be appreciated that the representative methods do not necessarily have to be executed in the order presented, or in any particular order, unless otherwise indicated. Moreover, various activities described with respect to the methods can be executed in serial or parallel fashion, or any combination of serial and parallel operations. In one or more aspects, the method illustrates operations for the systems and devices disclosed herein.

What is claimed:

1. A system comprising:
one or more processors; and
a memory that stores one or more programs that are configured to be executed by the one or more processors, the one or more program comprising instructions to perform acts that:
obtain a query having a target source code snippet likely to have a performance bug;
transform the target source code snippet into a simplified parse tree, wherein the simplified parse tree comprises a plurality of nodes, wherein each node represents a keyword token or a non-keyword token;
extract, from the simplified parse tree, structural features and performance features from the target source code snippet, wherein a performance feature comprises at least one of a chain invocation feature, nested function call feature, repeat function call feature, definition or use feature or member access feature;
access a code recommendation table, wherein the code recommendation table comprises a plurality of performance-improved source code snippets, wherein the code recommendation table is indexed by a set of difference features for each performance-improved source code snippet, wherein the set of difference features comprises structural features and performance features of before-code version of a particular performance-improved source code snippet not seen in the particular performance-improved source code snippet;

search for performance-improved source code snippets in the code recommendation table having at least one performance feature matching a performance feature of the target source code snippet;

compute a score for each performance-improved source code snippet having at least one matching performance feature, wherein the score is based on the set of difference features of a performance-improved source code snippet;

identify one or more performance-improved source code snippets for the target source code snippet from the plurality of the performance-improved source code snippets having a score that exceeds a threshold, wherein the existence of the identified one or more performance-improved source code snippets indicate that the target source code snippet has a performance bug; and outputting the identified one or more performance-improved source code snippets to remedy the performance bug, wherein the outputting comprises ranking the one or more performance-improved source code snippets in an order from highest score first.

2. The system of claim 1, wherein each performance-improved source code snippet is associated with a Uniform Resource Locator of a pull request, wherein the pull request comprises the performance-improved source code snippet.

3. The system of claim 1, wherein the structural features include a token feature, one or more parent features, one or more sibling features, or one or more variable usage features.

4. The system of claim 2, wherein the one or more programs comprise instructions to perform acts that: output the pull request of the target performance-improved source code snippet.

5. The system of claim 1, wherein the score is computed as a ratio of a number of common structural features and performance features of the target source code snippet with the set of difference features of a performance-improved source code snippet over a number of structural features and performance features of the performance-improved source code snippet.

6. The system of claim 1, wherein the target source code snippet is a hot code method identified from profile data of a program as likely having a performance bug.

7. The system of claim 1, wherein the one or more programs comprise instructions to perform acts that:

generate a code recommendation for the target source code snippet for each performance-improved source code snippet having a score that exceeds a threshold.

8. A computer-implemented method, comprising:

obtaining a target source code snippet likely to have a performance bug;

transforming the target source code snippet into a simplified parse tree, wherein the simplified parse tree comprises a plurality of nodes, wherein a node comprises a keyword token or a non-keyword token;

extracting from the simplified parse tree at least one performance feature and structural features, wherein a performance feature comprises at least one of a chain invocation feature, nested function call feature, repeat function call feature, definition or use feature or member access feature;

searching a code recommendation table comprising a plurality of performance-improved source code snippets for select performance-improved source code snippets having a performance feature matching the at least one performance feature extracted from the simplified parse tree, wherein each of the performance-improved source code snippets are indexed by a set of difference features, wherein the set of difference features comprises the structural features and the performance features of a before-code version of a particular performance-improved source code snippet not seen in the particular performance-improved source code snippet;

associating a score for each of the select performance-improved source code snippets having a performance feature matching the at least one performance feature extracted from the simplified parse tree, wherein each score is based on the set of difference features of each matching performance-improved source code snippet;

identifying one or more performance-improved source code snippets for the target source code snippet from the select performance-improved source code snippets having a score that exceeds a threshold, wherein the existence of the identified one or more performance-improved source code snippets indicates that the target source code snippet has a performance bug; and outputting the identified one of the performance-improved source code snippets to remedy the performance bug, wherein the outputting comprises ranking the identified one or more performance-improved source code snippets in an order from highest score first.

9. The computer-implemented method of claim 8, further comprising:

associating with each performance-improved source code snippet a Uniform Resource Locator to a pull request including the performance-improved source code snippet; and outputting the URL of the select one of the performance-improved source code snippets.

10. The computer-implemented method of claim 8, further comprising:

analyzing profile data of the target source code snippet; and identifying the target source code snippet as likely having a performance bug when the profile data indicates an abnormal amount of resource usage.

11. The computer-implemented method of claim 8, wherein a performance-improved source code snippet is associated with an improvement to a performance bug.

12. The computer-implemented method of claim 8, wherein the structural features include a token feature, a parent feature, a sibling feature, or a variable usage feature.

13. The computer-implemented method of claim 8, wherein the score is computed as a ratio of a number of common structural features and performance features of the target source code snippet with the set of difference features of a performance-improved source code snippet over a number of structural features and performance features of the performance-improved source code snippet.

14. A hardware storage device having stored thereon computer executable instructions that are structured to be executable by a processor of a computing device to thereby cause the computing device to perform actions that:

identify a target method body likely to have a performance bug;

transform the target method body into a simplified parse tree, wherein the simplified parse tree comprises a plurality of nodes, wherein a node comprises a keyword token or a non-keyword token;

extract from the simplified parse tree at least one performance feature and structural features, wherein a performance feature comprises at least one of a chain invocation feature, nested function call feature, repeat function call feature, definition or use feature or member access feature;

search a code recommendation table comprising a plurality of performance-improved method bodies for select performance-improved method bodies having a performance feature matching the at least one performance feature extracted from the simplified parse tree, wherein each of the performance-improved method bodies are indexed by a set of difference features, wherein the set of difference features comprises structural features and performance features of a before-code version of a particular performance-improved method body not seen in the particular performance-improved method body;

associate a score for each of the select performance-improved method bodies having a performance feature matching the at least one performance feature extracted from the simplified parse tree, wherein each score is based on the set of difference features of each matching performance-improved method body;

identify one or more performance-improved source code method bodies for the target method body from the select performance-improved method bodies having a score that exceeds a threshold, wherein the existence of the identified one or more performance-improved method bodies indicates that the target method body has a performance bug; and output the identified one of the performance-improved method bodies to remedy the performance bug, wherein the outputting comprises ranking the identified one or more performance-improved method bodies in an order from highest score first.

15. The hardware storage device of claim 14, further comprising:

associate with each performance-improved method body a Uniform Resource Locator (URL) to a pull request including the performance-improved method body; and output the URL of the select one of the performance-improved method bodies.

16. The hardware storage device of claim 14, further comprising:

analyze profile data of the target method body; and identify the target method body as likely having a performance bug when the profile data indicates an abnormal amount of resource usage.

17. The hardware storage device of claim 14, wherein a performance-improved method body is associated with an improvement to a performance bug.

18. The hardware storage device of claim 14, wherein the structural features include a token feature, a parent feature, a sibling feature, or a variable usage feature.

19. The hardware storage device of claim 14, wherein the score is computed as a ratio of a number of common structural features and performance features of the target method body with the set of difference features of a performance-improved method body over a number of structural features and performance features of the performance-improved method body.

* * * * *